United States Patent
Brockschmidt, Jr. et al.

(10) Patent No.: US 10,693,298 B1
(45) Date of Patent: Jun. 23, 2020

(54) METHODS AND SYSTEMS FOR MATCHING A LOAD TO A PEAK POWER POINT OF A POWER GENERATING DEVICE

(71) Applicant: The Boeing Company, Chicago, IL (US)

(72) Inventors: Arthur Brockschmidt, Jr., Chicago, IL (US); Tina Stoia, Chicago, IL (US); Shailesh Atreya, Chicago, IL (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 16/023,000

(22) Filed: Jun. 29, 2018

(51) Int. Cl.
*H02J 3/38* (2006.01)
*G05B 15/02* (2006.01)
*H02J 3/12* (2006.01)
*B60L 8/00* (2006.01)

(52) U.S. Cl.
CPC .............. *H02J 3/385* (2013.01); *G05B 15/02* (2013.01); *H02J 3/12* (2013.01); *B60L 8/003* (2013.01)

(58) Field of Classification Search
USPC .......................................................... 702/85
See application file for complete search history.

(56) References Cited

U.S. PATENT DOCUMENTS

| 4,163,194 A * | 7/1979 | Ross ...................... H02S 50/10 136/290 |
| 5,604,430 A * | 2/1997 | Decker ..................... G05F 1/67 323/275 |
| 5,923,100 A * | 7/1999 | Lukens ..................... G05F 1/67 136/206 |
| 2009/0310391 A1* | 12/2009 | Becker-Irvin ..... H01L 31/02021 363/79 |
| 2019/0384340 A1* | 12/2019 | Li .......................... H02J 1/102 |

* cited by examiner

*Primary Examiner* — Paul D Lee
(74) *Attorney, Agent, or Firm* — McDonnell Boehnen Hulbert & Berghoff LLP (57) ABSTRACT

Example methods and systems described herein include periodically adjusting load applied to a power generating device according to a testing cycle, detecting a peak power point of the power generating device and an associated load that results in the peak power point, adjusting the load applied to the power generating device to match the associated load that results in the peak power point, and based on the adjusted load drawing power outside of a threshold amount of the peak power point, (i) calculating a correction factor to apply to a reference voltage of the power generating device and (ii) adjusting a frequency of the testing cycle.

20 Claims, 8 Drawing Sheets

METHODS AND SYSTEMS FOR MATCHING A LOAD TO A PEAK POWER POINT OF A POWER GENERATING DEVICE

STATEMENT REGARDING FEDERALLY SPONSORED RESEARCH OR DEVELOPMENT

This invention was made with Government support under Contract Number HR0011-10-9-0010 awarded by Defense Advanced Research Projects Agency. The Government has certain rights in this invention.

FIELD

The present disclosure relates to a system for delivering power to a load, and more particularly, to a power management system for tracking and delivering peak power to maximize efficiency of use of the power.

BACKGROUND

Use of solar energy as a source of energy for various types of devices is well known in the art. The solar energy is collected during the daytime via a solar panel or solar power source electrically connected to an energy storage device. Energy stored in the energy storage device is discharged to power the device. For example, a solar powered vehicle utilizes solar energy as a power source to power the vehicle during the day as well as to generate power for storage in an energy storage device, such as a rechargeable battery or a storage capacitor, which may be used during the nighttime.

Solar powered vehicles thus tend to charge the energy storage device during the day for use to power the vehicles for nighttime operation. A solar profile changes throughout the day as the sun rises, moves across the sky, and sets, resulting in a large change in amount of power that is generated. In addition, during winter solstice or as seasons change, an amount of sunlight changes as well. Thus, over time, amounts of power generated and stored during the day by a solar power source can vary widely.

As a result, it is very desirable for each kilo-watt of power output from the solar power source to be used efficiency.

What is needed is an ability to track peak power transfer from a power source, such as a solar power source, to a load, and to alter operation accordingly to maximize peak power transfer and maximize efficiency of use of available power.

SUMMARY

In an example, a method is described including periodically adjusting load applied to a power generating device according to a testing cycle, detecting a peak power point of the power generating device and an associated load that results in the peak power point, adjusting the load applied to the power generating device to match the associated load that results in the peak power point, and based on the adjusted load drawing power outside of a threshold amount of the peak power point, (i) calculating a correction factor to apply to a reference voltage of the power generating device and (ii) adjusting a frequency of the testing cycle.

In another example, a system is described including a power generating device to generate electricity, a power meter coupled to the power generating device for measuring voltage and/or current output of the power generating device, a power converter coupling a load to the power generating device and configured to adjust the load applied to the power generating device, and a computing device coupled to the power meter and the power converter. The computing device has one or more processors configured to execute instructions stored in memory to perform functions comprising detecting a peak power point of the power generating device and an associated load that results in the peak power point based on the measured voltage and/or current output of the power generating device, causing adjustment of the load applied to the power generating device to match the associated load that results in the peak power point, and based on the adjusted load drawing power outside of a threshold amount of the peak power point, (i) calculating a correction factor to apply to a reference voltage of the power generating device and (ii) adjusting a frequency of the testing cycle.

In another example, a non-transitory computer readable memory is described having stored therein instructions, that when executed by a computing device, cause the computing device to perform functions comprising periodically adjusting load applied to a power generating device according to a testing cycle, detecting a peak power point of the power generating device and an associated load that results in the peak power point, adjusting the load applied to the power generating device to match the associated load that results in the peak power point, and based on the adjusted load drawing power outside of a threshold amount of the peak power point, (i) calculating a correction factor to apply to a reference voltage of the power generating device and (ii) adjusting a frequency of the testing cycle.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for tracking power output from a power generating device and controlling operation accordingly are described. An example method includes periodically adjusting load applied to a power generating device according to a testing cycle, detecting a peak power point of the power generating device and an associated load that results in the peak power point, adjusting the load applied to the power generating device to match the associated load that results in the peak power point, and based on the adjusted load drawing power outside of a threshold amount of the peak power point, (i) calculating a correction factor to apply to a reference voltage of the power generating device and (ii) adjusting a frequency of the testing cycle.

Example systems and methods described herein may enable reducing power tracking error to less than about 1%. For example, thresholds can be set such that the system determines whether the load draws power outside of between about 0.1% to about 0.5% of the peak power point, and then responsively calculates the correction factor.

In an example use case, solar powered vehicles (e.g., cars, aircraft, unmanned aerial vehicle (UAV), etc.) utilize solar power to charge fuel cells for use to power the vehicles during night time operation. Because the solar profile changes throughout the day and throughout the year, changes in available power are experienced over time. Thus, it is desirable to capture and store power during the day that is used as efficiently as possible to extend range of use of the vehicle.

To ensure that the power is used efficiently, peak power outputs are tracked to match load to the peak power capability of the power generating device at each specific time of day. When the power generating device is generating large amounts of power (e.g., for a solar power generating device, this occurs at times of day with maximum sunlight), larger loads can be applied and powered. However, when the power generating device is generating less power (e.g., for a solar power generating device, this occurs at times of day with less sunlight), then smaller loads can be applied and powered. In any scenario of available power, however, it is desirable to apply a load that enables the power generating device to operate efficiently and provide the peak power point.

Within examples herein, systems and methods enable tracking power capability of the power generating device throughout the day (e.g., tracking capability of a solar array with sunlight available at a specific time and angle), and then adjusting use and delivery of power accordingly, such as between electric engines/motors and/or on-board batteries for storage and later use. Tracking the power capability can include testing the power generating device periodically for a short time (e.g., a few seconds or milliseconds (ms)), detecting a peak power point during the testing time, and adjusting power (e.g., voltage) fed to device components (e.g., motors, fuel cells) accordingly.

Figure 1:
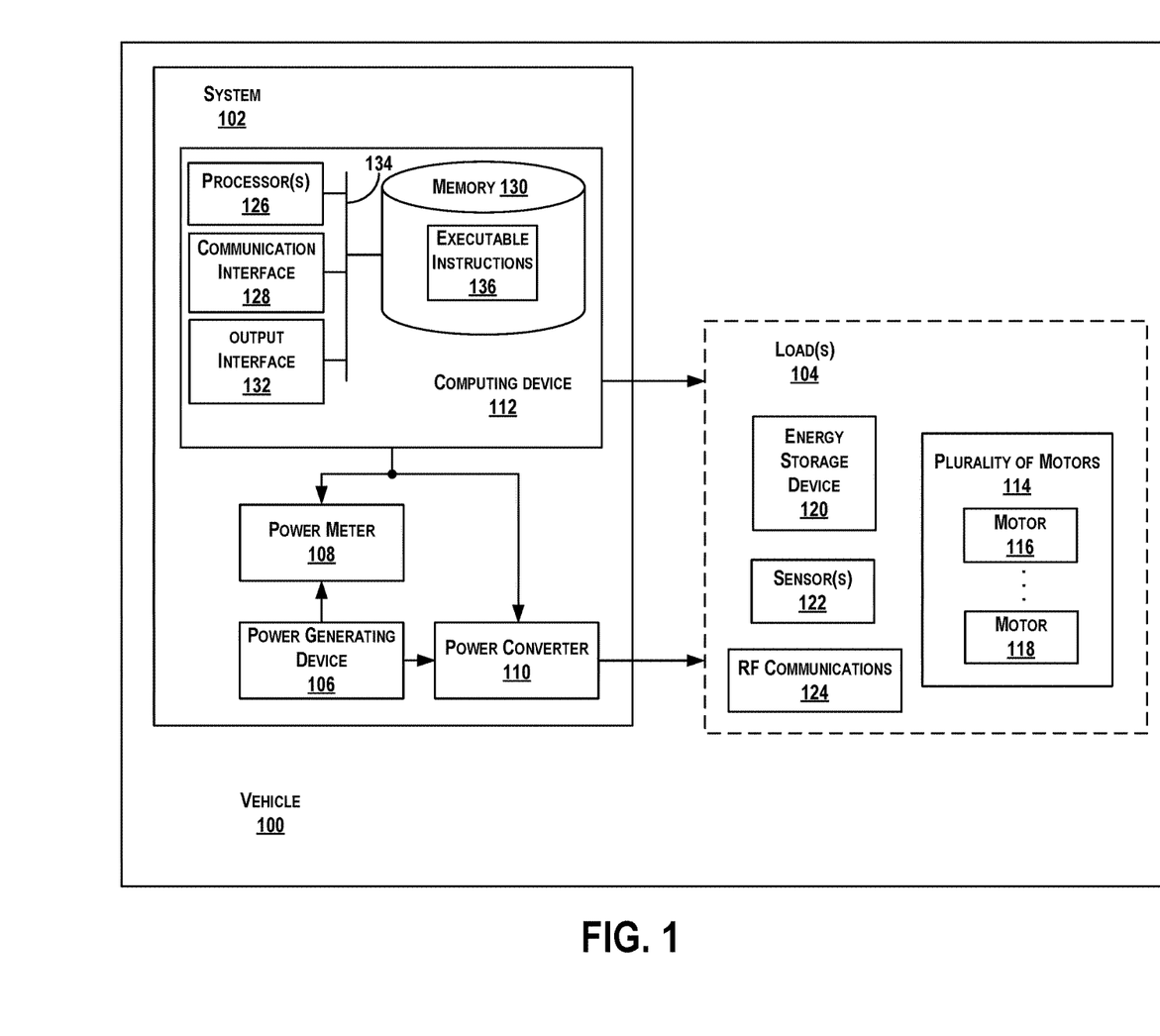
FIG. 1 illustrates a vehicle, according to an example implementation.

Referring now to the figures, FIG. 1 illustrates a vehicle 100, according to an example implementation. The vehicle 100 includes a system 102 coupled to load(s) 104. The system 102 includes a power generating device 106 to generate electricity, a power meter 108 coupled to the power generating device 106 to measure voltage and/or current output of the power generating device 106, and a power converter 110 coupling the load(s) 104 to the power generating device 106. The power converter 110 is configured to adjust the load(s) 104 applied to the power generating device 106. The system 102 further includes a computing device 112 coupled to the power meter 108 and the power converter 110.

The vehicle 100 may take the form of many different types of vehicles including an aerial vehicle, an un-manned aerial vehicle (UAV), a drone, a helicopter device, a multicopter, an autonomous driven vehicle, a land vehicle, a water vehicle, a water submersible vehicle, among other possibilities. In some examples, the vehicle 100 is stationary, and in other examples, the vehicle 100 has a capability to maneuver through an area.

The system 102 includes the computing device 112 coupled to the power meter 108 and the power converter 110, which may either be directly or indirectly coupled, and may either be coupled using wireless or wired means. Similarly, the power converter 110 may either be directly or indirectly couple the load(s) 104 to the power generating device 106.

The load(s) 104 include any number (one or more than one) of components that utilize power or are configured to utilize power from the power generating device 106. Example load(s) 104 includes a plurality of motors 114, which is shown to include two motors 116 and 118. The motors 116 and 118 can be a combustion engine or an electric motor to name a few examples. While two motors 116 and 118, more than two motors may be included, and each motor includes substantially the same components, for example.

Additional example load(s) 104 include an energy storage device 120, sensor(s) 122, and RF communications 124.

The energy storage device 120 may include one or more batteries, storage capacitors, or other device capable of storage power generated by the power generating device 106.

The sensor(s) 122 can include any number or type of sensors including a camera, a microphone, a biosensor, a temperature sensor, a RADAR, an inertial measurement unit (IMU) that can include both an accelerometer and a gyroscope, a magnetometer, a pressure sensor (or barometer), and a radiation sensor. The sensor(s) 122 enable the vehicle 100 to sense objects in an environment and to assist with operation of the vehicle 100. As one example, the microphone includes an auditory-sensor to identify an auditory signature or auditory level in the environment. As another example, the RADAR can determine a distance to an object or, sense the presence of, and/or determine the distance to the object. The RADAR can also include a light detection and ranging (LIDAR) system, laser detection and ranging (LADAR) system, and/or an infrared or forward-looking infrared (FLIR) system, among other possibilities. The radiation sensor can detect or identify a radiation level in the atmosphere or environment, for example.

The RF communications 124 include hardware to enable communication within the vehicle 100 and between the vehicle 100 and other devices (not shown). The hardware may include transmitters, receivers, and antennas, for example. For instance, the RF communications 124 may be a wireless interface and/or one or more wireline interfaces that allow for both short-range communication and long-range communication to one or more networks or to one or more remote devices.

The power generating device 106 can include a solar array, or other devices capable of generating power such as a mechanical generator that runs on fuel or gasoline. A solar array can include a photovoltaic system with solar panels designed to supply usable solar power by means of photovoltaic cells.

The power meter 108 can be configured to measure an amount of electrical energy in a form of voltage and/or current consumed by the load(s) 104, and can include an electro-mechanical or electronic power meter. Example power meters are well-known in the art.

The power converter 110 can be configured to be a buck-boost converter, such as a type of DC-to-DC converter that has an output voltage magnitude that is either greater than or less than an input voltage magnitude. For example, the power converter 110 can operate as a buck converter (step-down converter), which includes a DC-to-DC power converter that steps down voltage (while stepping up current) from an input (supply) to an output (load). In other examples, the power converter 110 can operate as a boost converter (step-up converter), which includes a DC-to-DC power converter that steps up voltage (while stepping down current) from an input (supply) to an output (load). The power converter 110 may include inductor(s), switches, and a resistor-capacitor (RC) circuit enabling operation as desired. Example power converters are well-known in the art.

The computing device 112 may be used to perform functions of methods described herein, and may be coupled to the power meter 108 and the power converter 110 as well as to the load(s) 104 (or in communication with the load(s) 104) to receive outputs of such components and to provide inputs to such components. The computing device 112 has a processor(s) 126, and also a communication interface 128, memory 130, and an output interface 132 each connected to a communication bus 134. The computing device 112 may also include hardware to enable communication within the computing device 112 and between the computing device 112 and other devices (not shown). The hardware may include transmitters, receivers, and antennas, for example.

The communication interface 128 may be a wireless interface and/or one or more wireline interfaces that allow for both short-range communication and long-range communication to one or more networks or to one or more remote devices.

The memory 130 may include or take the form of one or more computer-readable memory or computer readable storage media that can be read or accessed by the processor(s) 126. The computer-readable storage media can include volatile and/or non-volatile storage components, such as optical, magnetic, organic or other memory or disc storage, which can be integrated in whole or in part with the processor(s) 126. The memory 130 is considered non-transitory computer readable memory or non-transitory computer readable media. In some examples, the memory 130 can be implemented using a single physical device (e.g., one optical, magnetic, organic or other memory or disc storage unit), while in other examples, the memory 130 can be implemented using two or more physical devices.

The memory 130 thus is a non-transitory computer readable memory, and executable instructions 136 are stored thereon. The instructions 136 include computer executable code. When the instructions 136 are executed by the processor(s) 126, the processor(s) 126 are caused to perform functions of the system 102.

The processor(s) 126 may be a general-purpose processor or a special purpose processor (e.g., digital signal processors, application specific integrated circuits, etc.). The processor(s) 126 may receive inputs from the communication interface 128 as well as from the load(s) 104, the power meter 108, and the power converter 110, and process the inputs to generate outputs that are stored in the memory 130 and output via the output interface 132.

The output interface 132 outputs information to the power meter 108, the power converter 110, and the load(s) 104 or to other components as well. Thus, the output interface 132 may be similar to the communication interface 128 and can be a wireless interface (e.g., transmitter) or a wired interface as well.

Within examples, the computing device 112 monitors power output by the power generating device 106, via the power meter 108, to control an amount of the load(s) 104 coupled to the power generating device 106, via the power converter 110, so that the power drawn and delivered by the power generating device 106 is within a threshold amount of a peak power point available at that time. This enables an optimal and efficient usage of the power available, rather than operating all the load(s) 104 independent of available power. This also enables optimized usage of power taking into account other factors, such as range of use desired for the vehicle, for example.

In a specific example, when the power generating device 106 is a solar array, power available varies throughout the day based on available sunlight. As more power is available, a larger amount of power can be delivered resulting in more of the load(s) 104 being operable. Conversely, as less power is available, a smaller amount of power can be delivered resulting in fewer of the load(s) 104 being operable.

In some examples, to achieve this operation, when the instructions 136 are executed by the processor(s) 126, the processor(s) 126 are caused to perform functions including detecting a peak power point of the power generating device 106 and an associated load that results in the peak power point based on the measured voltage and/or current output of the power generating device 106, causing adjustment of the load(s) 104 applied to the power generating device 106 to match the associated load that results in the peak power point, and based on the adjusted load drawing power outside of a threshold amount of the peak power point, (i) calculating a correction factor to apply to a reference voltage of the power generating device 106 and (ii) adjusting a frequency of the testing cycle.

Figure 2:
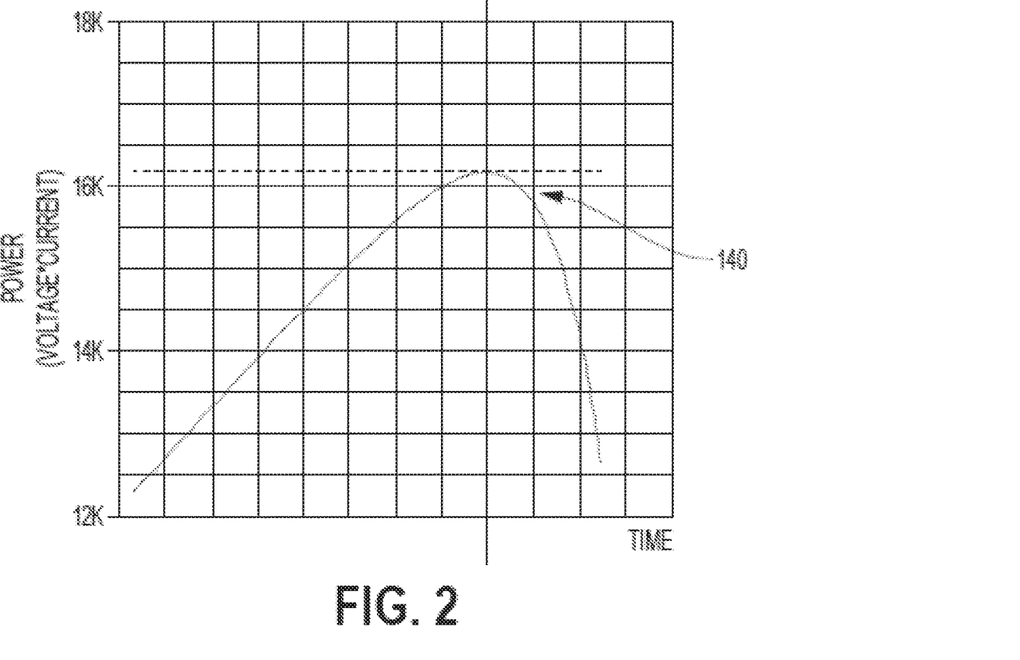
FIG. 2 is an example graph illustrating power output vs. time of the power generating device with example load inputs, according to an example implementation.
Figure 3:
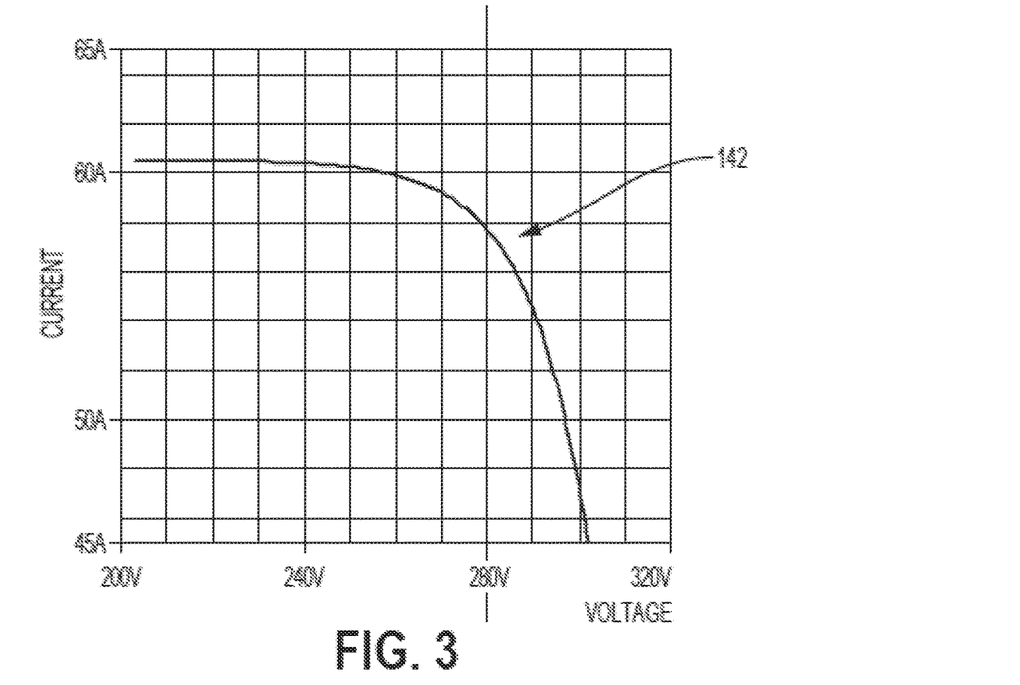
FIG. 3 is an example graph illustrating output current vs. output voltage of the power generating device with example load inputs, according to an example implementation.

FIG. 2 is an example graph illustrating power output vs. time of the power generating device 106 with example load inputs, and FIG. 3 is an example graph illustrating output current vs. output voltage of the power generating device 106 with example load inputs, each according to example implementations. The graphs in FIGS. 2 and 3 are over the same time period for purposes of this example.

The computing device 112 operates to detect a peak power point 140 of the power generating device 106 and an associated load that results in the peak power point 140 based on the measured voltage and/or current output of the power generating device 106. As shown in the graph of FIG. 3, for portion of performance of the power generating device 106 and any associated load, the curve representing current remains fairly constant (since for the load(s) being operated, there is amble amount of available power). However, the current begins to decline as voltage increases, which indicates that there is some limitation on power (e.g., too high of loads/not enough available power). As the current begins to decrease, power still increases due to increasing voltage, but the output power will reach the peak power point 140 when the current reaches point 142, for example. Following, output power decreases as voltage continues to increase.

Each type of solar array or other specific power generating device will have a distinct output current vs. output voltage curve (as shown in FIG. 2) that can vary over time or during the day, and the computing device 112 operates to detect the peak power point 140 at any given time to capture a maximum or peak power output of the power generating device 106. This is advantageous, for example, when the vehicle 100 is an UAV operating on solar power and requires power for operation at nighttime to power the motor, and operating the vehicle at a high degree of efficiency enables the UAV to extend its operation time further into the night and/or to extend a range of the UAV at any time of day.

Figure 4:
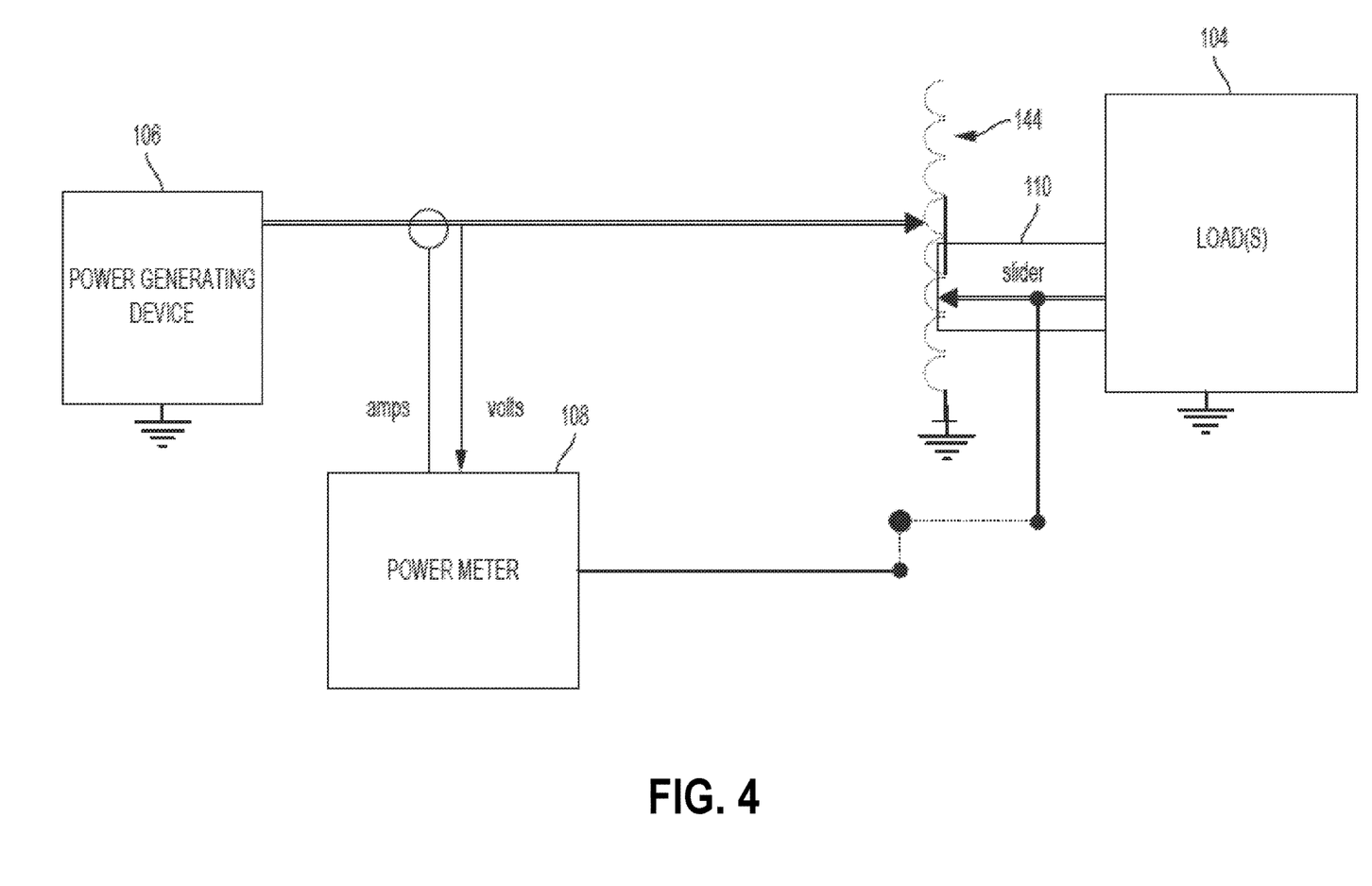
FIG. 4 is an example conceptual circuit to illustrate a portion of the system and the load(s) of FIG. 1 for peak power point detection, according to an example implementation.

FIG. 4 is an example conceptual circuit to illustrate a portion of the system 102 and the load(s) 104 of FIG. 1 for peak power point detection, according to an example implementation. The power generating device 106 generates electricity measured in power and/or voltage/current, and the power meter 108 is coupled to the power generating device 106 to measure and record power, for example, as shown in the graphs of FIGS. 2 and 3. In addition, the load(s) 104 are connected to the power generating device 106 through the power converter 110, which is shown as a slider (e.g., a potentiometer) to change an amount of current flowing through the power meter 108. A power transformer 144 is further shown, for example, which may be useful in some circumstances for different types of the load(s) to deliver power accordingly. The power converter 110 thus adjusts an amount of load drawing power from the power generating device 106 until a peak power point is detected at the power meter 108. In this example, the power converter 110 (e.g., slider) can be manually adjusted to observe power changes from lower to greater power values with a clear peak identified as a maximum. The power converter 110 can be linked to the power meter 108 to determine the peak power point. When implemented with the computing device 112, adjustment occurs programmatically to reach a peak power point setting automatically, and a feedback loop is provided to maintain operation at the peak power point throughout the day, for example.

In FIG. 1, the computing device 112 is shown to include the processor(s) 126, which may be microprocessors, and the memory 130 storing the executable instructions 136 for performing functions of example methods described herein, such as for detection of the peak power point and operation of the vehicle accordingly to maximize power usage at the peak power point based on available power.

Figure 5:
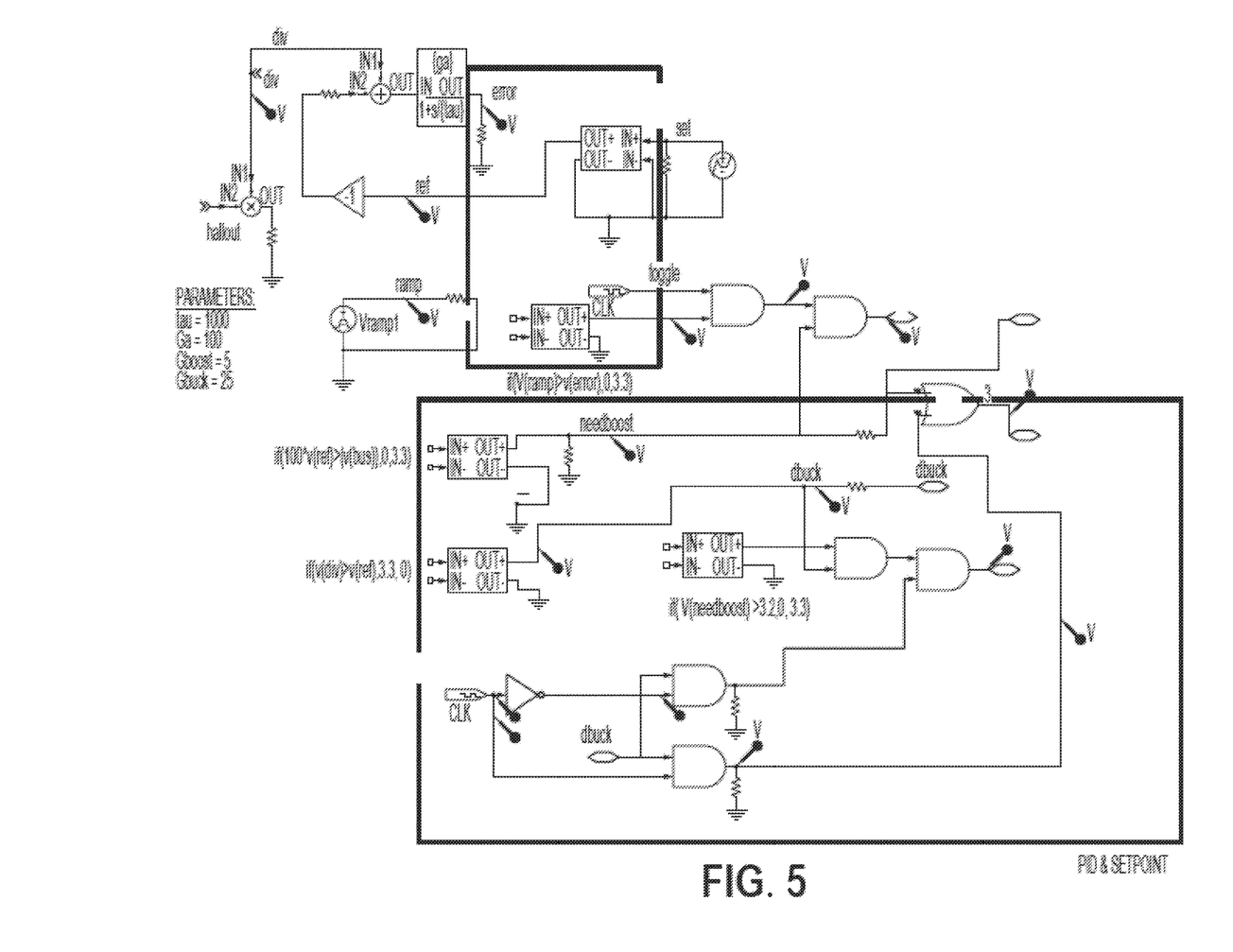
FIG. 5 is an example schematic diagram of circuitry for performing example methods described herein, according to an example implementation.

FIG. 5 is an example schematic diagram of circuitry for performing example methods described herein, according to an example implementation. The drive voltages are drives to power electronics that result in $V_{boost}$. The equations below are a derivation of voltage needed to correct for an error of feedback due to limited feedback gain. This assumes that a boost (increase) versus a buck (decrease) voltage is needed to achieve peak power point operation. A boost voltage is needed if the peak power voltage is below the bus voltage, and a buck voltage is needed if the peak power voltage is above the bus voltage.

$$V_{pp} + V_{boost} = V_{bus}$$

$V_{boost} = G_{boost} * V_e$, where $G_{boost}$ is boost stage gain (feedback gain) and $V_e$ is error amp output (e.g., as normally found in control circuits)

$V_e = G_a * (V_{sense} - V_{ref})$, where $G_a$ is amp gain $$V_{boost} = G_b * G_a * (V_{sense} - V_{ref})$$

$$V_{set} = \frac{V_{pp}}{div},$$

where $V_{set}$ is voltage set from array sweep for peak power, and div is resistor divider ratio (e.g., typically 100)

For boost, to correct for gain offsets, the following equations are used:

$$V_{ref} = \frac{V_{pp}}{div} - \frac{(V_{bus} - V_{pp})}{G_a * G_b}$$

$$V_{ref} = V_{set} - \left(\frac{div}{G_a * G_b}\right) * \left(\frac{V_{bus}}{div - V_{set}}\right)$$

Then this is inserted into the processor logic (or proportional integral differential (PID) logic) to set $V_{ref}$. For buck, the offset is in the same direction, but the sign changes since the peak power voltage is above the bus voltage. The correction factor is related to changes applied to $V_{ref}$.

Figure 6:
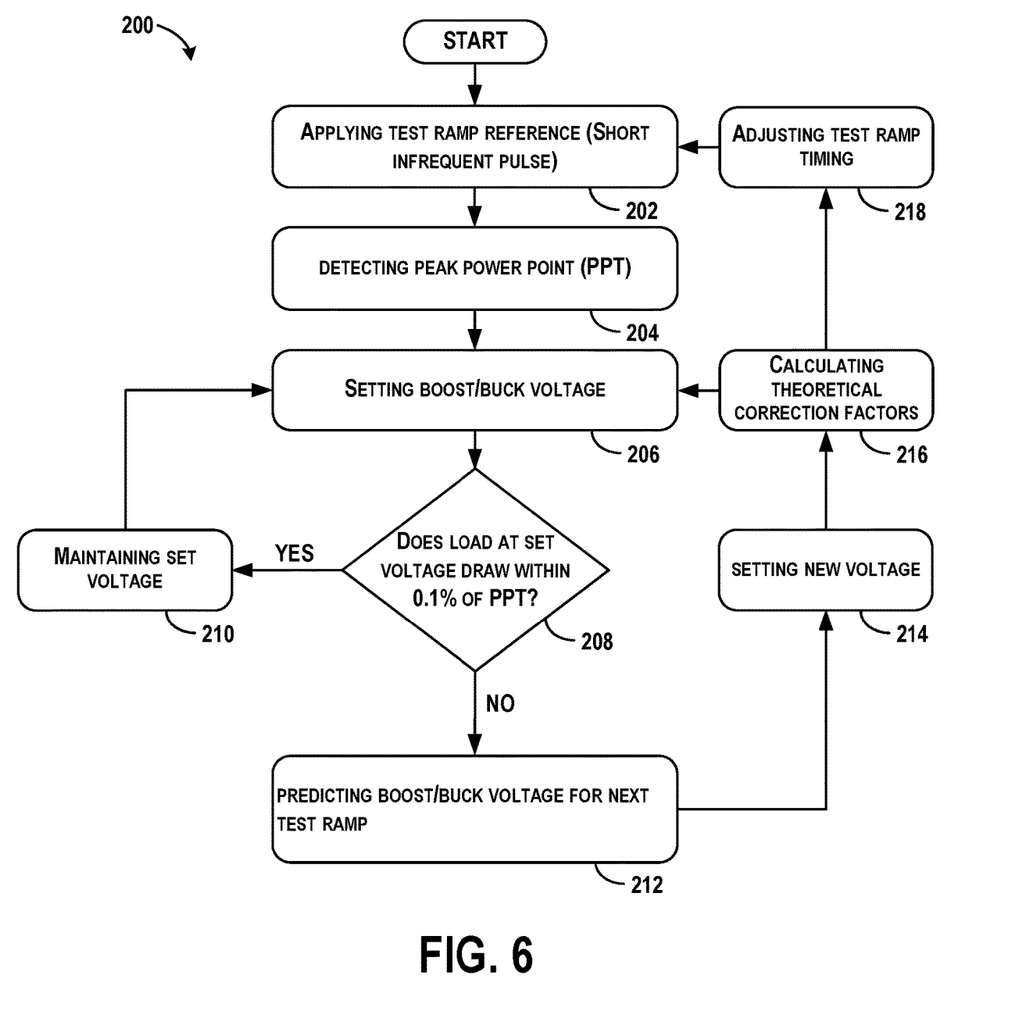
FIG. 6 shows a flowchart of an example method for matching a load to a peak power point of the power generating device, according to an example implementation.

FIG. 6 shows a flowchart of an example method 200 for matching a load to a peak power point of the power generating device 106, according to an example implementation. Method 200 shown in FIG. 6 presents an example of a method that could be used with the vehicle shown in FIG. 1 or with components of the vehicle 100, such as the system 102, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-218. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes applying a test ramp reference (short infrequent pulse) to the power generating device 106. For example, a test load that is cycled from zero load to short circuit load over a short time period (e.g., 1-2 ms) is applied as a varying load to the power generating device 106. As shown in FIG. 4, for example, the load(s) 104 and the power converter 110 are applied and periodically varied between fully open and completely short circuit over a short time frame. By adjusting the load(s) 104 applied, power drawn from the power generating device 106 will vary and reach a peak power point.

Referring back to FIG. 6, at block 204, the method 200 includes detecting the peak power point (PPT). This may include, for example, detecting output voltage and output current that the power generating device 106 outputs at the peak power point. During this time, to discover the load resulting in the peak power point, power output is monitored in fine time intervals (e.g., within 1-2 ms) recording power in each interval and recording an associated load which results in the recorded power. Following, the load(s) 104 connected to power generating device 106 are adjusted to match what is discovered to be an amount of load yielding peak power at a given time.

At block 206, the method 200 includes setting boost/buck voltage of the power generating device 106. The power converter 110 is coupled to the power generating device 106 and to the load(s) 104, and the power converter sets a boost/buck voltage of the power converter 110 to feed the load(s) 104 a voltage/current resulting in peak power point of the power generating device 106. The power converter 110 can control both current and voltage independently. Thus, referring to the graphs of FIGS. 2 and 3, the power converter 110 will set boost/buck voltage of the power generating device 106 to be that at point 142 resulting in the peak power point of 140. The voltage may be referred to as a boost voltage in instances in which the power converter HO steps up voltage (while stepping down current) from the power generating device 106 to the load(s) 104 to achieve the peak powerpoint 140, and the voltage may be referred to as a buck voltage in instances in which the power converter 110 steps down voltage (while stepping up current) from the power generating device 106 to the load(s) 104 to achieve the peak power point 140.

At block 208, the method 200 includes determining whether the load(s) 104 at the set voltage (e.g., $V_{ref}$) draw within 0.1% of PPT. For example, the computing device 112 receives an output of the power meter 108, and determines if the output is within 0.1% of the determined PPT. Although, FIG. 6 illustrates a threshold of 0.1%, in other examples, different thresholds may be used such as between about 0.1% to about 0.5% of the peak power point.

If the load(s) 104 at set voltage draws within 0.1% of PPT, at block 210, the method 200 includes maintaining the set voltage and performing threshold test again at a predetermined time. It is not desirable to perform the testing too often because this draws power and can become inefficient. Thus, predetermined time periods for testing can be established, such as every 5-10 minutes in this scenario.

If the load(s) 104 at set voltage do not draw within 0.1% of PPT, at block 212, the method 200 includes predicting a boost/buck voltage for a next test ramp. For example, a proportional integral differential (PID) operation can be used to predict boost/buck voltage for next a test ramp resulting in an adjustment of the load(s) 104 applied to the power generating device 106 to match the associated load that results in the peak power point. The load(s) 104 can be adjusted in many ways, such as for example, by changing throttle (e.g., how fast the UAV is enabled to travel depends on power input into the motors 116 and 118).

To predict or anticipate a next peak power point during load test, a rate of change of the peak power point (from that as expected to that as observed) is used to estimate a future peak power point at the set loads and voltages. This rate of change, or derivative of power vs. time $$\left(\frac{dp}{dt}\right),$$

indicates how fast the reference voltage is changing, for example, due to output voltage of the power generating device (e.g., solar array) dynamically changing as a result of movement of solar arrays and movement of sun.

At block 214, the method 200 thus includes setting a new boost/buck voltage based on the predicted subsequent peak power point as determined from the $$\left(\frac{dp}{dt}\right).$$

At block 216, the method 200 includes calculating theoretical correction factors to apply to the peak power point. For example, the equations shown above can be used to calculate the corrections factors to apply to $V_{ref}$. Using the equations shown above, error is determine as 1/gain, and the set of equations are used to calculate error amounts. The error amounts are used as feedback to adjust the $V_{ref}$. Following, the correction factor is a voltage differential.

At block 218, the method 200 includes adjusting test ramp timing, such as adjusting a frequency of the testing cycle. Applying fewer load tests results in greater efficiency, and so a feedback loop with correction capability is implemented to determine how frequently to run the tests.

In summary, the method 200 shown in FIG. 6 enables operation of the vehicle at about 99.9% power efficiency by operating test loads between open and close circuit, detecting the peak power point, adjusting voltage output by the power generating device 106 to achieve the peak power point, and then monitoring for variances of the peak power point outside of a predetermined threshold amount (e.g., about 0.1%). If within the threshold, the voltage output is maintained. However, if outside of the threshold, a new voltage output of the power generating device 106 is set to enable more or less voltage to be delivered to the load(s) 104 resulting in an adjustment of load applied to the power generating device 106, or alternatively, the load(s) 104 applied to the power generating device 106 are adjusted to be an amount operable with the new voltage output set for the power generating device 106.

Figure 7:
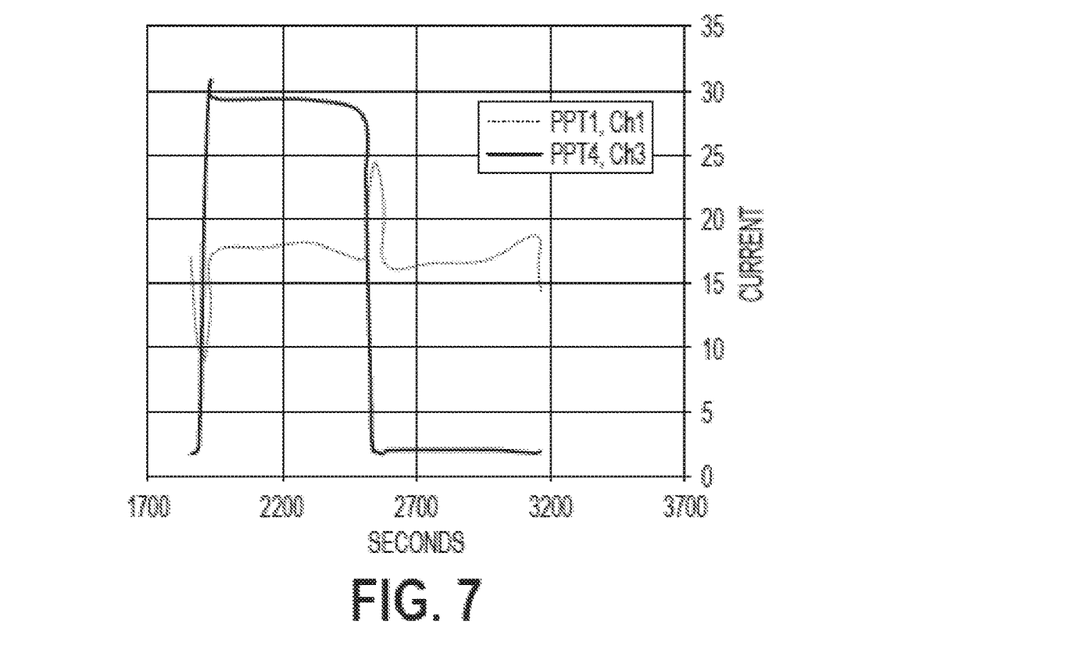
FIG. 7 is an example graph of output current vs. time for the power generating device, according to an example implementation.
Figure 8:
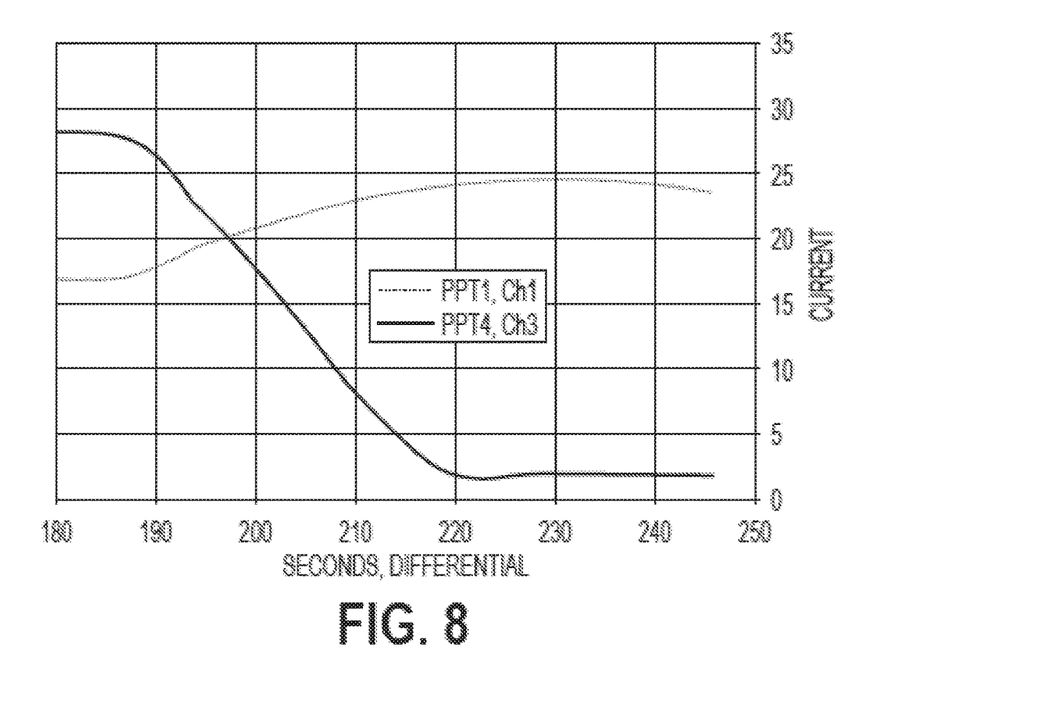
FIG. 8 is another example graph of output current vs. time for the power generating device, according to an example implementation.

FIG. 7 is an example graph of output current vs. time for the power generating device 106, according to an example implementation. FIG. 8 is another example graph of output current vs. time for the power generating device 106, according to an example implementation. FIG. 8 is the same graph as FIG. 7, but on an expanded time scale. The examples shown in FIGS. 7 and 8 illustrate power generated and output by the power generating device 106 as varying over time, e.g., for a solar array being exposed to cyclic exposure to sunlight.

In FIG. 7, a slope of transition times shows $$\left(\frac{di}{dt}\right)$$

of 35 A per 39 second or approximately 1 Amp/second. This data is for a short circuit current and corresponds to the power generating device 106 isolation level. The peak power point should respond at least this fast for highest efficiency. To obtain maximum efficiency, the sampling time needs to be at a minimum and interval between sampling a maximum. In the graphs, PPT4 shows a rate of change of a solar array output. PPT1 is a response of control circuits to the changes of the solar array output. This timing is controlled by circuit values. FIGS. 7 and 8 show a speed of a response needed to achieve maximum efficiency. FIGS. 7 and 8 are the same waveform, simply on different time scales.

Figure 9:
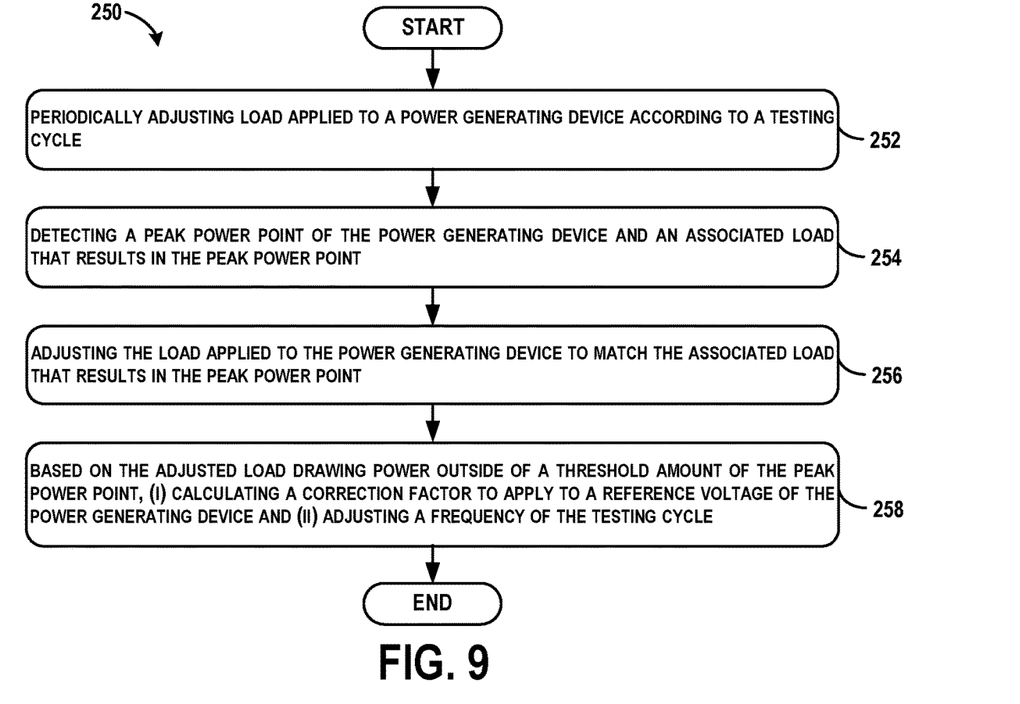
FIG. 9 shows a flowchart of another example method for matching a load to a peak power point of the power generating device, according to an example implementation.

FIG. 9 shows a flowchart of another example method 250 for matching a load to a peak power point of the power generating device 106, according to an example implementation. Method 250 shown in FIG. 9 presents an example of a method that could be used with the vehicle 100 shown in FIG. 1 or with components of the vehicle 100, such as the system 102 for example. Further, devices or systems may be used or configured to perform logical functions presented in FIG. 9. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 252-258. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. In addition, each block or portions of each block in FIG. 9, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 252, the method 200 includes periodically adjusting the load(s) 104 applied to the power generating device 106 according to a testing cycle. The testing cycle can vary and amounts of loads to use can vary as well.

Figure 10:
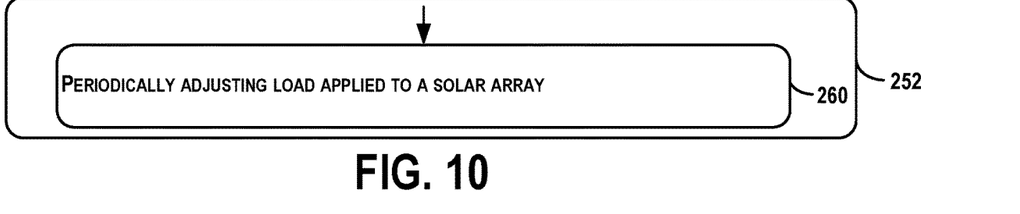
FIG. 10 shows a flowchart of an example method for periodically adjusting load applied to the power generating device as shown in FIG. 9, according to an example implementation.

FIG. 10 shows a flowchart of an example method for periodically adjusting load applied to the power generating device as shown in block 252 of FIG. 9, according to an example implementation. At block 260, functions include periodically adjusting load applied to a solar array.

Figure 11:
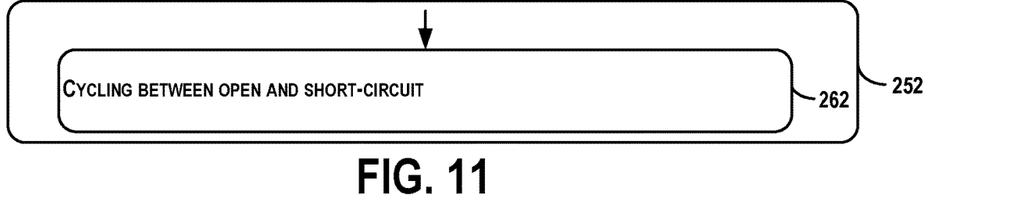
FIG. 11 shows a flowchart of another example method for periodically adjusting load applied to the power generating device as shown in FIG. 9, according to an example implementation.

FIG. 11 shows a flowchart of another example method for periodically adjusting load applied to the power generating device as shown in block 252 of FIG. 9, according to an example implementation. At block 262, functions include cycling between open and short-circuit.

Figure 12:
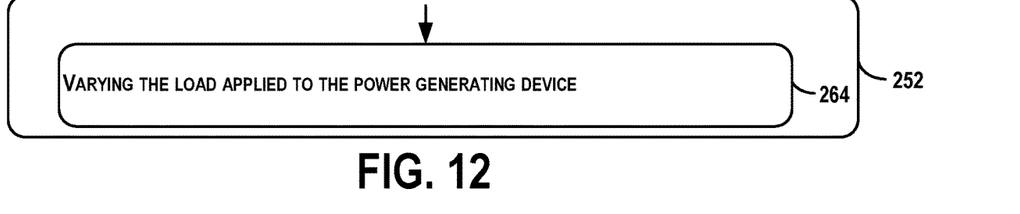
FIG. 12 shows a flowchart of another example method for periodically adjusting load applied to the power generating device as shown in FIG. 9, according to an example implementation.

FIG. 12 shows a flowchart of another example method for periodically adjusting load applied to the power generating device as shown in block 252 of FIG. 9, according to an example implementation. At block 264, functions include varying the load applied to the power generating device.

Returning to FIG. 9, at block 254, the method 200 includes detecting a peak power point of the power generating device 106 and an associated load that results in the peak power point.

Figure 13:
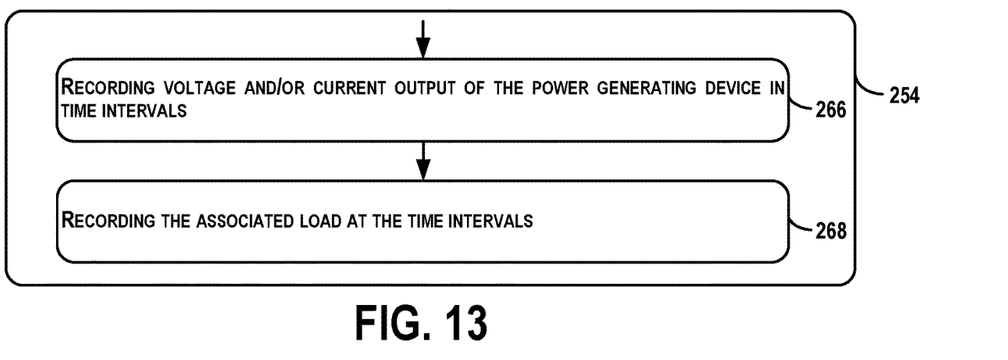
FIG. 13 shows a flowchart of an example method for detecting the peak power point of the power generating device and the associated load that results in the peak power point as shown in FIG. 9, according to an example implementation.

FIG. 13 shows a flowchart of an example method for detecting the peak power point of the power generating device and the associated load that results in the peak power point as shown in block 254 of FIG. 9. At block 266, functions include recording voltage and/or current output of the power generating device in time intervals, and at block 268 functions include recording the associated load at the time intervals.

Returning to FIG. 9, at block 256, the method 200 includes adjusting the load applied to the power generating device 106 to match the associated load that results in the peak power point. At block 258, the method 200 includes based on the adjusted load drawing power outside of a threshold amount of the peak power point, (i) calculating a correction factor to apply to a reference voltage of the power generating device 106 and (ii) adjusting a frequency of the testing cycle.

Figure 14:
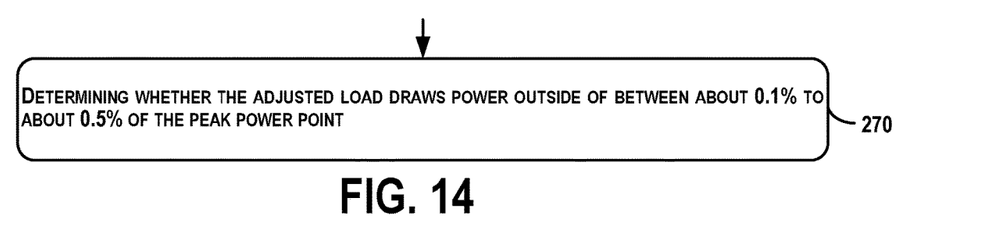
FIG. 14 shows a flowchart of an example method for an additional function for use with the function shown in FIG. 9, according to an example implementation.

FIG. 14 shows a flowchart of an example method for an additional function for use with the function shown in block 258 of FIG. 9, according to an example implementation. At block 270, functions include determining whether the adjusted load draws power outside of between about 0.1% to about 0.5% of the peak power point. Other threshold amounts of the peak power point may additionally or alternatively be used as the threshold for comparison within the feedback loop, such as 1%, 5%, 10% for systems having lower efficiency requirements, for example.

Figure 15:
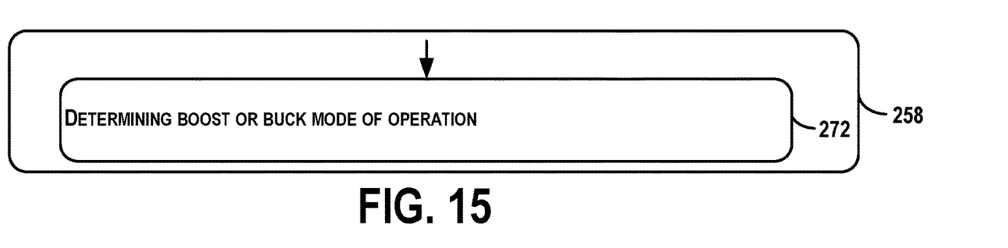
FIG. 15 shows a flowchart of an example method for calculating the correction factor to apply to a reference voltage of the power generating device as shown of FIG. 9, according to an example implementation.

FIG. 15 shows a flowchart of an example method for calculating the correction factor to apply to a reference voltage of the power generating device as shown in block 258 of FIG. 9, according to an example implementation. At block 272, functions include determining boost or buck mode of operation, as described above using the equations, for example.

Figure 16:
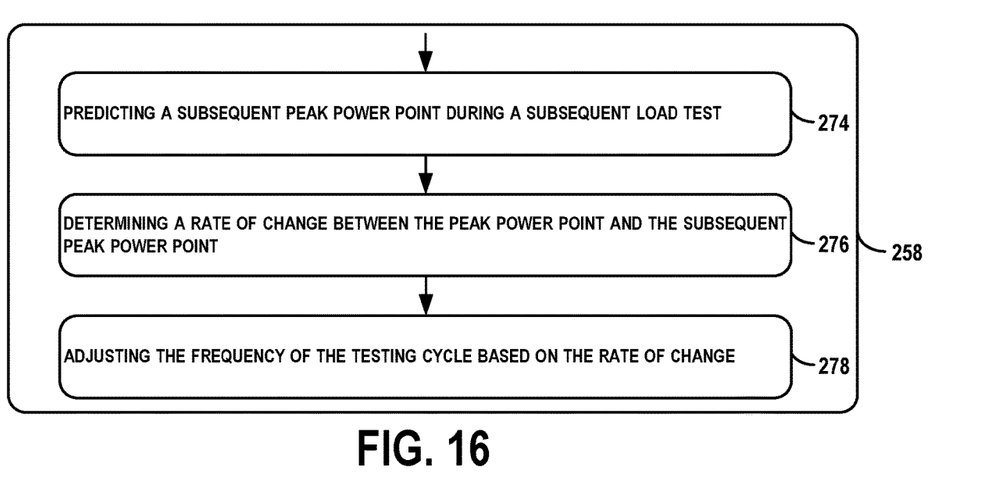
FIG. 16 shows a flowchart of an example method for adjusting a frequency of the testing cycle as shown in FIG. 9, according to an example implementation.

FIG. 16 shows a flowchart of an example method for adjusting a frequency of the testing cycle as shown in block 258 of FIG. 9, according to an example implementation. At block 274, functions include predicting a subsequent peak power point during a subsequent load test, at block 276 functions include determining a rate of change between the peak power point and the subsequent peak power point, and at block 278 functions include adjusting the frequency of the testing cycle based on the rate of change. The subsequent peak power point may be predicted using a slope or rate of change of the observed peak power point to the initial detected peak power point at the first test ramp, for example.

The computing device (e.g., FPGA or PID) remembers and stores a previous sampling duration and interval. If the solar array output is less variable than a previous period (e.g., change by less than a noted change in a previous period), the testing frequency interval is increased. On the other hand, if the solar array output is more variable than a previous period (e.g., change by more than a noted change in a previous period), the testing frequency interval is decreased.

Using the systems and methods herein enables optimal power usage of the system 102 as the output power from the power generating device 106 varies over time. This enables extended usage of the vehicle 100 or of components of the vehicle 100 through optimal power usage.

Examples described herein further provide technological improvements that are particular to power usage by determining optimal peak power points of the power generating device at any given time. This can address technical problems, such as extending a range of operating time of the vehicle when power is scarce.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   periodically adjusting load applied to a power generating device according to a testing cycle;
   detecting a peak power point of the power generating device and an associated load that results in the peak power point;
   adjusting the load applied to the power generating device to match the associated load that results in the peak power point; and
   based on the adjusted load drawing power outside of a threshold amount of the peak power point, (i) calculating a correction factor to apply to a reference voltage of the power generating device and (ii) adjusting a frequency of the testing cycle.

2. The method of claim 1, wherein periodically adjusting load applied to the power generating device comprises:
   periodically adjusting load applied to a solar array.

3. The method of claim 1, wherein periodically adjusting load applied to the power generating device comprises:
   cycling between open and short-circuit.

4. The method of claim 1, wherein periodically adjusting load applied to the power generating device comprises:
   varying the load applied to the power generating device.

5. The method of claim 1, wherein detecting the peak power point of the power generating device and the associated load that results in the peak power point comprises:
   recording voltage and/or current output of the power generating device in time intervals; and
   recording the associated load at the time intervals.

6. The method of claim 1, further comprising:
   determining whether the adjusted load draws power outside of between about 0.1% to about 0.5% of the peak power point.

7. The method of claim 1, wherein calculating the correction factor to apply to the peak power point comprises:
   calculating the correction factor based on error voltages and control circuit loop gain.

8. The method of claim 1, wherein adjusting the frequency of the testing cycle comprises:
   predicting a subsequent peak power point during a subsequent load test;

determining a rate of change between the peak power point and the subsequent peak power point; and adjusting the frequency of the testing cycle based on the rate of change.

9. A system comprising:

a power generating device to generate electricity;

a power meter coupled to the power generating device, the power meter measuring voltage and/or current output of the power generating device;

a power converter coupling a load to the power generating device, the power converter configured to adjust the load applied to the power generating device; and a computing device coupled to the power meter and the power converter, the computing device having one or more processors configured to execute instructions stored in memory to perform functions comprising:

detecting a peak power point of the power generating device and an associated load that results in the peak power point based on the measured voltage and/or current output of the power generating device;

causing adjustment of the load applied to the power generating device to match the associated load that results in the peak power point; and based on the adjusted load drawing power outside of a threshold amount of the peak power point, (i) calculating a correction factor to apply to a reference voltage of the power generating device and (ii) adjusting a frequency of the testing cycle.

10. The system of claim 9, wherein the power generating device comprises a solar array.

11. The system of claim 9, wherein the power converter adjusts the load applied to the power generating device by cycling between open and short-circuit.

12. The system of claim 9, wherein the computing device is configured to detect the peak power point of the power generating device and the associated load that results in the peak power point by:

recording voltage and/or current output of the power generating device in time intervals; and recording the associated load at the time intervals.

13. The system of claim 9, wherein the computing device is further configured to:

determine whether the adjusted load draws power outside of between about 0.1% to about 0.5% of the peak power point.

14. The system of claim 9, wherein the computing device adjusts the frequency of the testing cycle by:

predicting a subsequent peak power point during a subsequent load test;

determining a rate of change between the peak power point and the subsequent peak power point; and adjusting the frequency of the testing cycle based on the rate of change.

15. A non-transitory computer readable memory having stored therein instructions, that when executed by a computing device, cause the computing device to perform functions comprising:

periodically adjusting load applied to a power generating device according to a testing cycle;

detecting a peak power point of the power generating device and an associated load that results in the peak power point;

adjusting the load applied to the power generating device to match the associated load that results in the peak power point; and based on the adjusted load drawing power outside of a threshold amount of the peak power point, (i) calculating a correction factor to apply to a reference voltage of the power generating device and (ii) adjusting a frequency of the testing cycle.

16. The non-transitory computer readable memory of claim 15, wherein the function of periodically adjusting load applied to the power generating device comprises:

periodically adjusting load applied to a solar array.

17. The non-transitory computer readable memory of claim 15, wherein the function of periodically adjusting load applied to the power generating device comprises:

cycling between open and short-circuit.

18. The non-transitory computer readable memory of claim 15, wherein the function of detecting the peak power point of the power generating device and the associated load that results in the peak power point comprises:

recording voltage and/or current output of the power generating device in time intervals; and recording the associated load at the time intervals.

19. The non-transitory computer readable memory of claim 15, wherein the instructions are further executable by the computing device to perform functions comprising:

determining whether the adjusted load draws power outside of between about 0.1% to about 0.5% of the peak power point.

20. The non-transitory computer readable memory of claim 15, wherein the function of adjusting the frequency of the testing cycle comprises:

predicting a subsequent peak power point during a subsequent load test;

determining a rate of change between the peak power point and the subsequent peak power point; and adjusting the frequency of the testing cycle based on the rate of change.

* * * * *